United States Patent [19]

Paulisch

[11] 4,125,287

[45] Nov. 14, 1978

[54] SEAT FOR VEHICLES

[76] Inventor: Heinz Paulisch, Eisenbahnstrasse 17, 8770 Lohr am Main, Germany

[21] Appl. No.: 771,338

[22] Filed: Feb. 23, 1977

[30] Foreign Application Priority Data

Feb. 23, 1976 [DE] Fed. Rep. of Germany ....... 2607192

[51] Int. Cl.² .............................................. B60N 1/02
[52] U.S. Cl. .................... 297/344; 297/417; 248/429
[58] Field of Search ............... 297/243, 344, 417, 356, 297/232; 248/429

[56] References Cited

U.S. PATENT DOCUMENTS

| 1,096,518 | 5/1914 | Steinbeck | 297/344 |
| 2,120,156 | 6/1938 | Simpson | 297/356 X |
| 2,753,947 | 7/1956 | Mach | 297/344 X |
| 3,316,014 | 4/1967 | Barecki | 297/243 X |
| 3,484,831 | 12/1969 | Higuchi | 297/356 |
| 3,507,472 | 4/1970 | Agee | 248/429 |
| 3,568,972 | 3/1971 | Sherman | 248/429 |
| 3,653,713 | 4/1972 | Reason | 297/243 |
| 3,880,465 | 4/1975 | Scheben | 297/355 |

FOREIGN PATENT DOCUMENTS

| 1,025,269 | 1/1953 | France | 297/417 |
| 613,195 | 11/1960 | Italy | 297/356 |
| 1,256,977 | 12/1971 | United Kingdom | 297/417 |

Primary Examiner—Francis K. Zugel

Attorney, Agent, or Firm—Bacon & Thomas

[57] ABSTRACT

In a seat adapted for use in a seating arrangement in a vehicle an upholstered seat with a hinged, tiltable backrest, a maximum degree of comfort and legroom for passengers is provided with a minimum of floorspace required.

For this purpose the seat is equipped with a seat frame and a backrest frame assembly which are both curved in the direction transverse to the seat or the backrest. The seat is thus well adapted to the shape of a human body without the use of relatively thick upholstery for the seat and the backrest and additional kneeroom for a person sitting on a seat behind is obtained. Seat and backrest each comprise frame members which facilitate this curvature and the backrest may be fitted with a curved thin shell of sheet metal or plastic, thus further reducing the thickness required for the backrest upholstery. For such seats intended to be used in a row of seats adjacent to the long corridor of the vehicle, a facility for lateral displacement of the seat on its support frame is provided, and comprises a cylindrical and a flat guide assembly, which allows displacement of the seat without jamming. The armrest of such a seat in a further embodiment is equipped with a locking mechanism by which the armrest can be lowered into a position beside the seat or can be easily moved into and locked at any elevation.

7 Claims, 15 Drawing Figures

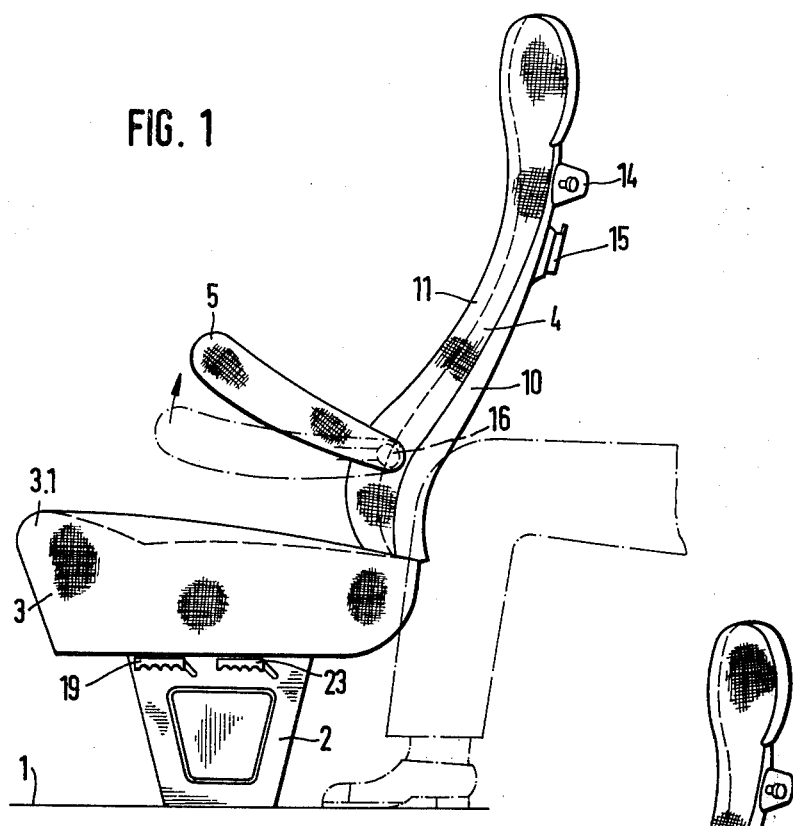
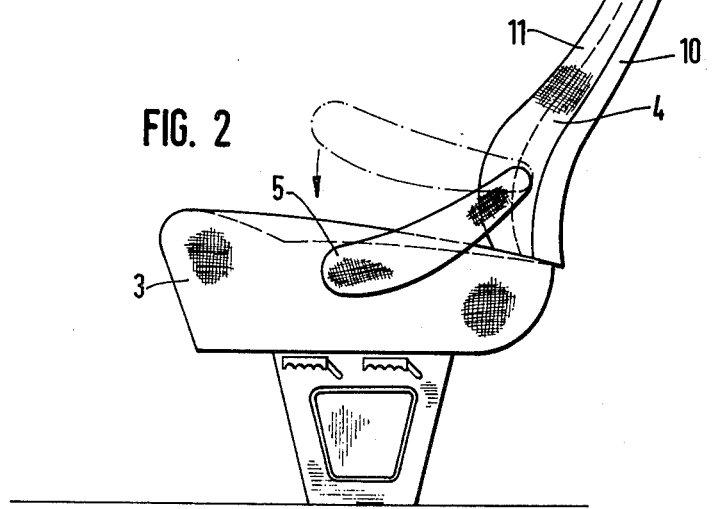

SEAT FOR VEHICLES

The invention relates to a seat and seating arrangement for vehicles, especially suitable for use in busses, with an upholstered seat having a hinged, tiltable backrest which can be adjusted by means of an adjustment lever, wherein the seat comprises a seat frame with tensioned springs extending between side seat frame portions and an upholstered seat, and the backrest comprises a backrest frame and a backrest upholstery.

Various requirements have to be taken into consideration for such a seating arrangment and seats. The seat should be lightweight and the floor space covered by it should be as small as possible. However, it should be ensured, that the user has as much room and freedom of movement for his legs and knees as possible. The shape of the seat should be comfortable and should be orthopaedically favourable for users of different body size. The rows of seats adjacent to the corridor of the vehicle should be provided with adjustment facilities, so that on one hand a corridor as wide as possible is available and on the other hand a part of the corridor space can be used to increase the leg room and the freedom of movement of the person using the seat, if this is desired.

For such seats it is known to make the profile of the seat and the backrest comfortable and orthopaedically favourable by a suitable shaping of the seat upholstery and backrest upholstery. The necessary support at the sides is provided by thicker side portions of the upholstery.

Since the shape of the seat and especially of the backrest is substantially determined by the upholstery, this must be relatively thick. However, thereby either the space taken up by the seats is increased or the freedom of movement for legs and knees is diminished. If one would reduce the thickness of the upholstery in order to reduce the space required, one would at least partly have to forego having a shape of the seat, which is comfortable and adapted to the shape of the body, and in this above all the transverse curvature obtained by the upholstery would be lost to a large extent.

It is therefore an object of the invention to provide seats of the above type which have a maximum degree of comfort and a shape adapted to the body, and at the same time require only a minimum of floor space.

In accordance with the invention, this objective is solved by providing a seat frame and a backrest frame which are curved in the direction transverse to the seat and the backrest. The transverse curvature required for an increased comfort thus is already achieved by means of the frame alone and not by the upholstery, wherefore the latter can be relatively thin and thus the space required, especially in the region of the backrest of the seat, is reduced and the leg room and freedom of movement for legs and knees is increased. Already by means of the shaping of the backrest frame the backrest is provided with the shape of a shell with a curvature in the longitudinal and in the transverse direction and with a relatively small thickness. Since the backrest of a seat which is adapted to the shape of a human body has a large forwardly directed curvature in the region of the hips, the additional transverse curvature results in an especially advantageous form of the kneeroom for the person sitting on the seat behind.

The seat frame suitably has seat frame members on the two sides and at their front ends a front seat frame member connecting the two side members is provided and extends in a downward direction. In this, under the load of the passenger occupying the seat, the desired transverse curvature for the seat can also be effected at the front edge of the seat without the upper legs of the user touching the front seat frame member. The backrest frame has two side frame portions or members which are connected by a top backrest frame member at their upper end and by a bottom backrest frame member at their lower end. This top backrest frame member and the bottom backrest frame member can also have a curvature in order to achieve the desired transverse curvature in the region of the upper and lower end of the backrest. An advantageous embodiment of the invention comprises a backrest frame which is provided with a shell also having a curvature in the transverse direction. This shell mainly defines the shape of the backrest and can consist of a thin material and requires only a very thin upholstered cover, so that the backrest has a very small thickness.

With a seat, which is especially intended for use in a row of seats adjacent to the long corridor of a vehicle, the seat can be displacable and arrestable in the lateral direction on the support frame and in an especially advantageous embodiment of the invention the seat is slidable on the support frame along a cylindrical guide assembly and a flat or plane guide assembly disposed in parallel to the former. Only a small space is taken up by these two guide assemblies, and therefore the leg room or freedom of legs of the user is not impaired and it is made possible to slide the seat without danger of jamming. In the formerly used arrangements with two cylindrical guides according to the state of the art, the seats had a tendency to jam on the guides. This danger was especially large, if for reasons of space requirements the distance between the two cylindrical guide assemblies was relatively small. These disadvantages are eliminated by the invention, since the direction of the guided movement of the seat is only determined by the cylindrical guide assembly, while the plane or flat guide assembly only provides a support in the vertical direction.

If the seat arrangement is intended for use in the rows of seats adjacent to the long corridor of a vehicle and the seat has at least one armrest connected to the side portion of the backrest by means of hinges or pivots and is adapted for height adjustment, a further embodiment of the invention provides an armrest, which can be tilted downwards into a position besides the backrest. In comparision to the conventional facilities for tilting the armrest upwards, this results in the further advantage, that the width of the corridor is enlarged in the region where it is especially desired and necessary, namely in the region of the arms of a person walking along the corridor.

In accordance with an embodiment of the invention, the locking mechanism for adjusting the armrest comprises a falling latch and a toothed ratchet for it. The toothed ratchet is disposed in the armrest, which can be rotated about a fixed pivot axis, and the ratchet is provided with a lifting flank for the falling latch at the lower end and with a stop for the falling latch at the upper end. The falling latch is freely rotatable about a fixed pivot axis and is provided with a pawl which latches, when the falling latch moves onto the lifting flank, and keeps the falling latch in a position in which it is disengaged from the toothed ratchet. The pawl disengages when the falling latch hits the upper stop, so that the falling latch falls into engagement with the toothed ratchet. In this, a support bracket is rotatably secured to the pivot of the armrest and the falling latch and the mounting of the latch are arranged in a position so that they mainly point in an upward direction. The pawl advantageously is formed by a spring plate.

The invention, together with its objectives, features and advantages, will become more readily apparent from the detailed description given below of an embodiment by way of an example and in connection with the drawings, in which:

FIG. 1 shows the seat in a side view,

FIG. 2 shows the seat in a side view with the lowered armrest,

Figure 3:
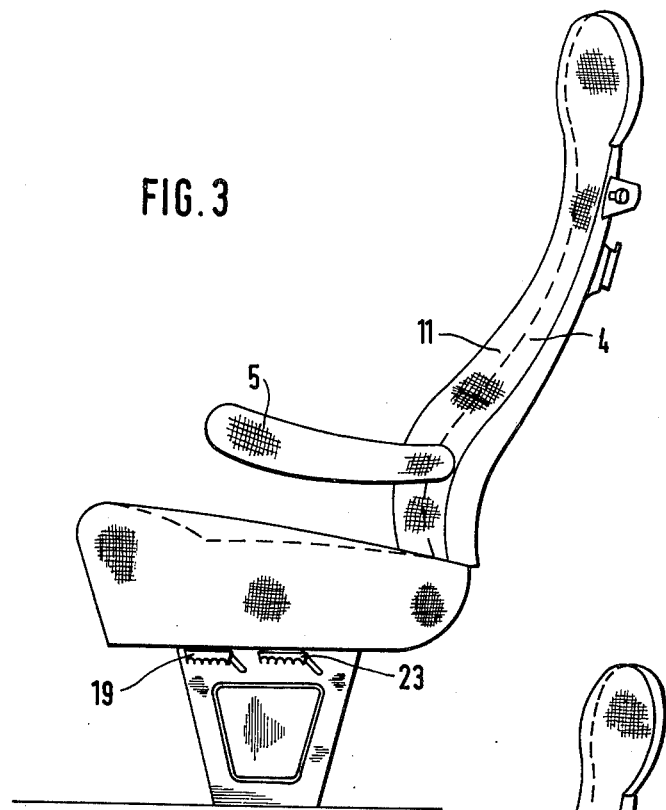
FIG. 3 shows a side view of the seat with a straight position of the backrest.

in FIG. 1 the seat is shown mounted on a support frame 2 resting on the floor 1 of the passenger compartment of a vehicle, e.g. a bus, and comprises a seat 3 and a backrest 4. At the side of the backrest 4 an armrest 5 is attached at least on the side adjacent to the corridor of the vehicle. In FIG. 1 the legs of a person sitting behind the illustrated seat are indicated by dashed lines.

The seat 3 has a seat frame assembly (see FIG. 5) preferrably consisting of steel tubing, which comprises two side frame members 6.1 which in the vicinity of their front ends are connected on both sides by means of a front seat frame member 6.2 extending downwardly. Coil springs 7 are attached under tension between the two side frame members 6.1 and preferrably are formed as coil springs contained in a plastic sheath. The springs 7 form lower springs or support springs supporting a cover of foamed plastic or a rubberoid cover. In the case of covers consisting of foamed plastic a formation of blocks is prevented by means of this arrangement with supporting lower springs 7. This cover forms a portion of a seat upholstery 3.1 .

At the rear edge of the seat frame 6 two stamped metal parts 8 are welded on and form the pivots for a backrest frame assembly 9, which preferrably also consists of steel tubing. The backrest frame assembly 9 comprises backrest side frame members 9.1 which at the top are connected by an upper backrest frame member 9.2 with a backward curvature and at the bottom the side frame members 9.1 are also connected by a lower frame member 9.3 of the backrest with a backward curvature. A shell 10 (see FIG. 1) is secured to the tubular backrest frame 9, e.g. by means of screws, and in the embodiment shown consists of sheet aluminum or of a plastic material. The shell 10 has a curvature in longitudinal direction and in transverse direction and provides the comfortable shape for the backrest, which is adapted to the shape of the human body, so that only a relatively thin backrest upholstery 11 is needed. A frame 13 of strip steel or wire material is secured to the backrest frame assembly 9 by means of welded mountings 12 and the cloth cover of the seat can be secured to this frame 13 by means of clamps or other suitable means. The shell 10 may also be bolted to the mountings 12.

On its backside the shell 10 carries a handle 14 and an ashtray 15, and possibly also a luggage net (not shown).

Figure 12:
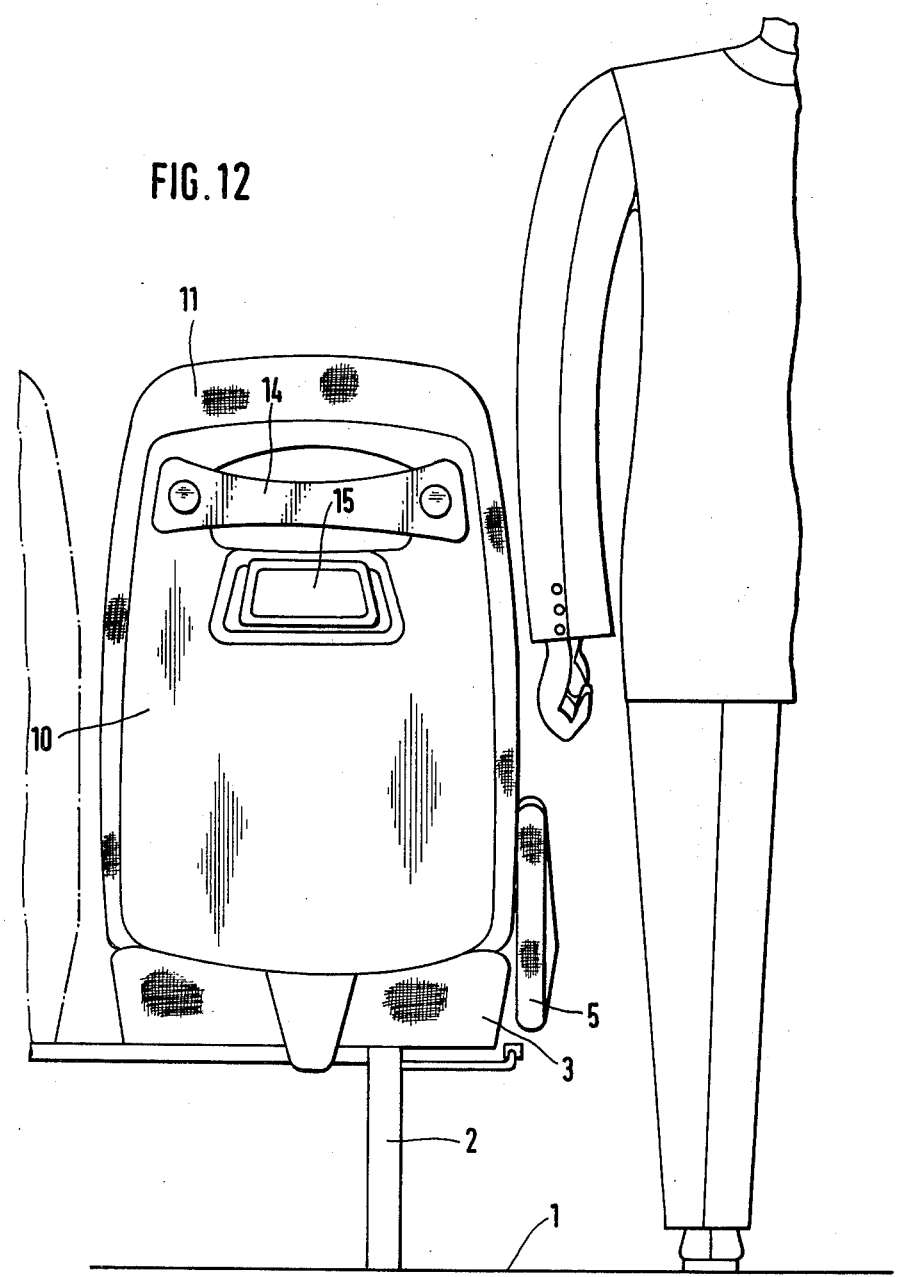
FIG. 12 shows a back view of the seat with a person standing beside it.

As shown in the FIGS. 1, 2, and 12 the armrest 5 can be tilted upwards and can be tilted downwards with the lowest position having the same height as the seat 3. For this purpose the armrest 5 is attached to the backrest assembly 9 by means of the pivot and ratchet assembly 16 (only indicated in dashed lines in FIG. 1). The pivot and ratchet assembly 16 is of the type as used with the head and foot portions of folding deck chairs. It has a locking mechanism for adjusting the armrest, which provides a support against a downwardly directed force in different elevations when the armrest 5 is moved upwards; i.e. if the user would want to move the armrest into a higher position, it is sufficient to lift the armrest, which will then remain in this position. This locking mechanism for adjusting the armrest 5 is disengaged in the uppermost position of the armrest 5, so that the armrest 5 may be lowered into the lower position as shown in FIGS. 2 and 12 and thus the width of the corridor of the vehicle in the region of the arms is especially large for a person walking along the corridor (see FIG. 12). In this lowermost position of the armrest 5 the locking mechanism of the pivot and ratchet assembly 16 is again engaged, so that the armrest 5 locks in each desired elevated position upon being lifted. The locking can take place continuously or in steps.

Figure 13:
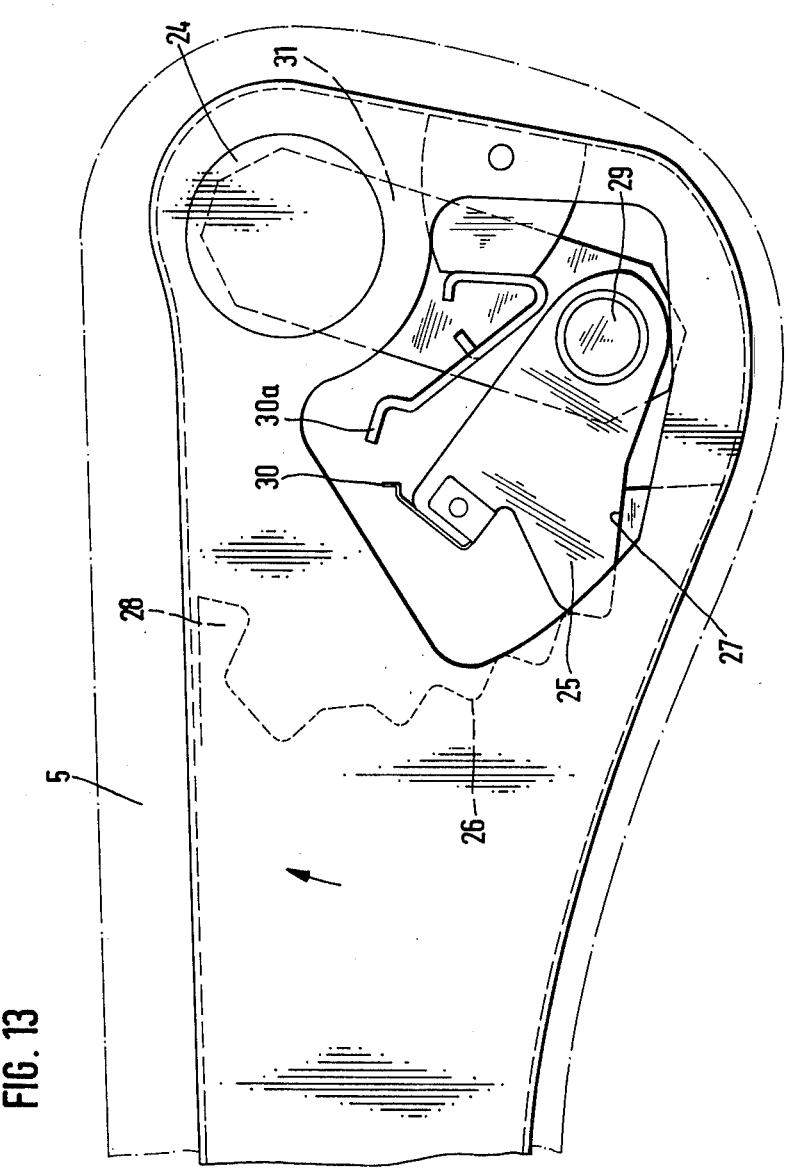
FIG. 13 shows a view of the locking mechanism for the armrest in the normal position of the armrest, 14 shows front view of the locking mechanism for adjusting the armrest, in the tilted position.
Figure 14:
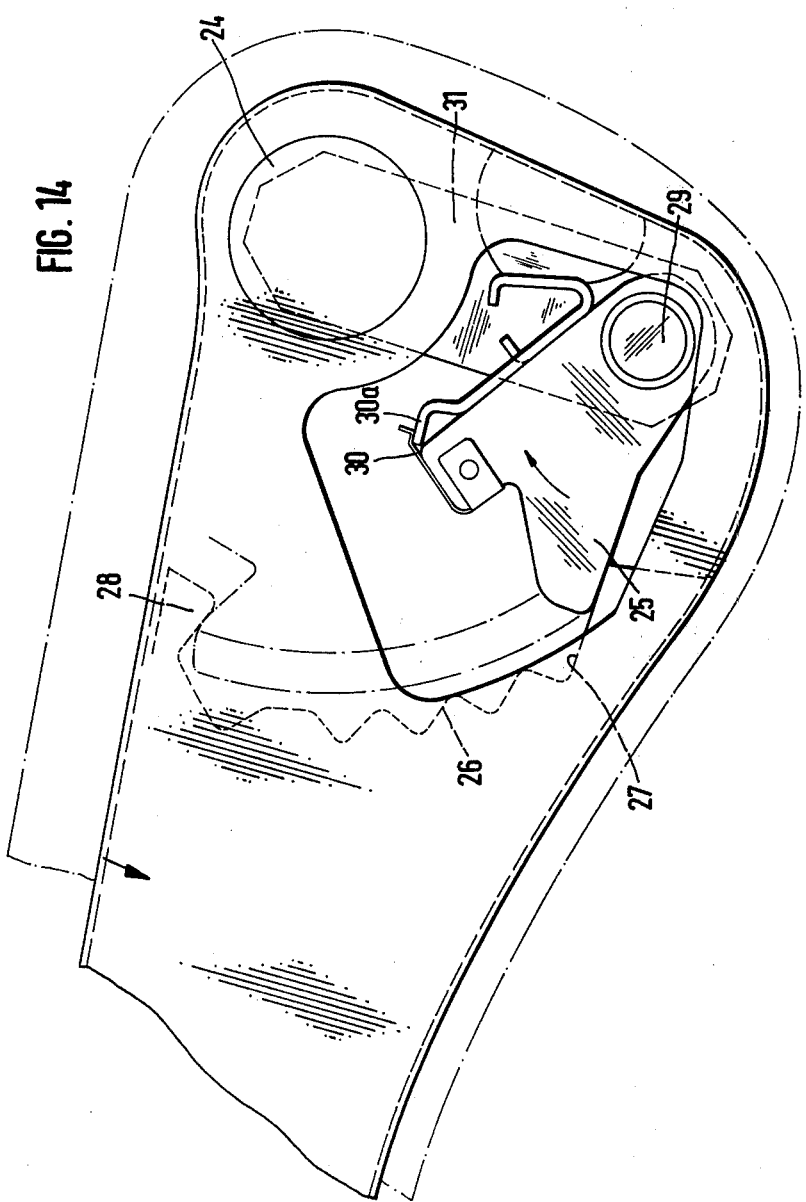
Figure 15:
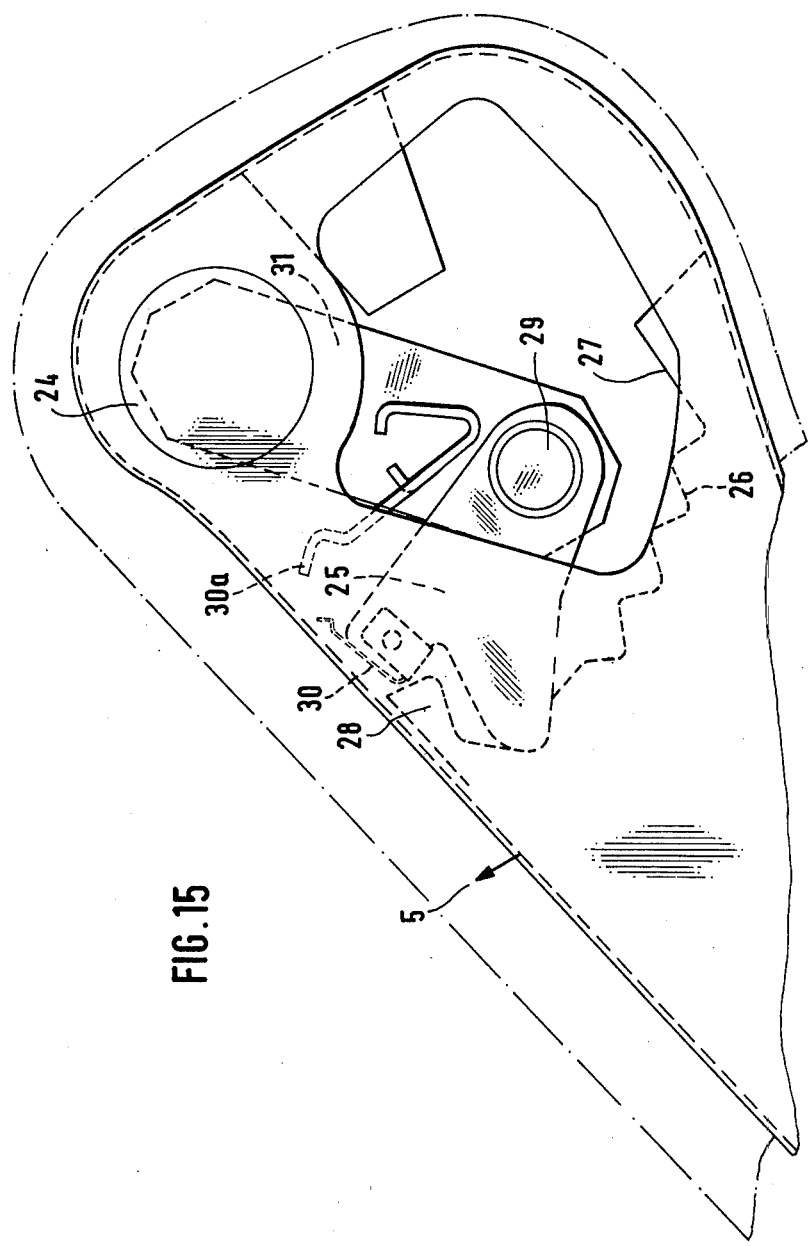
FIG. 15 shows a front view of the locking mechanism for adjusting the armrest, in the resting respectivity tilted up position.

The locking mechanism for adjusting the armrest 5 and its operation are shown in detail in FIGS. 13 to 15. It comprises a falling latch 25 and a toothed ratchet 26 for the latch 25. The toothed ratchet 26 is disposed within the armrest 5, which is pivotable around a fixed axis, and is provided with a lifting flank 27 for the falling latch 25 at the lower end and a stop 28 for the latch 25 at the upper end. The latch 25 is rotatably supported on a pivot 29 fixed in space and is provided with a pawl assembly 30, 30a, which engages when the falling latch 25 moves onto the lifting flank 27 and then holds the latch 25 in a position, in which it is disengaged from the ratchet 26. The pawl 30 disengages when the latch 25 hits the upper stop 28, so that the latch 25 falls into engagement with the ratchet 26. A support bracket 31 is non-rotatably mounted on the pivot 24 for the armrest 5 and on this the falling latch 25 and the pawl mounting 30a are disposed so that they point substantially upwards. The pawl 30 is formed by a spring plate.

FIG. 13 shows the locking mechanism for the armrest in its normal position — armrest 5 in horizontal position — in which the falling latch 25 engages the lowermost tooth of the ratchet 26 and maintains the armrest 5 in its position. When it is desired to lower the armrest 5, it is initially lifted in the direction as shown by means of the arrow in FIG. 13, wherein — see FIG. 14 — the latch 25 moves upwards on the lifting flank 27 which is thereby tilted around the pivot 29 in the direction as shown by the arrow, until latch 25 abuts the stop on the pawl mount 30a and the pawl 30 engages with it. The latch 25 is now kept in this position, so that the armrest 5 can be tilted downward around the pivot 24, while the latch 25 moves past the ratchet 26 along the arc indicated by a dash-dot line in FIG. 14, until it hits against the upper stop 28 and thereby the pawl 30/30a is released. The latch 25 again falls into the position as shown in FIG. 15. In the embodiment shown, the armrest 5 is tilted downwards under an angle of 42° and from this position may be moved into any desired locking position of the ratchet 26 and may be locked in this position.

Figure 4:
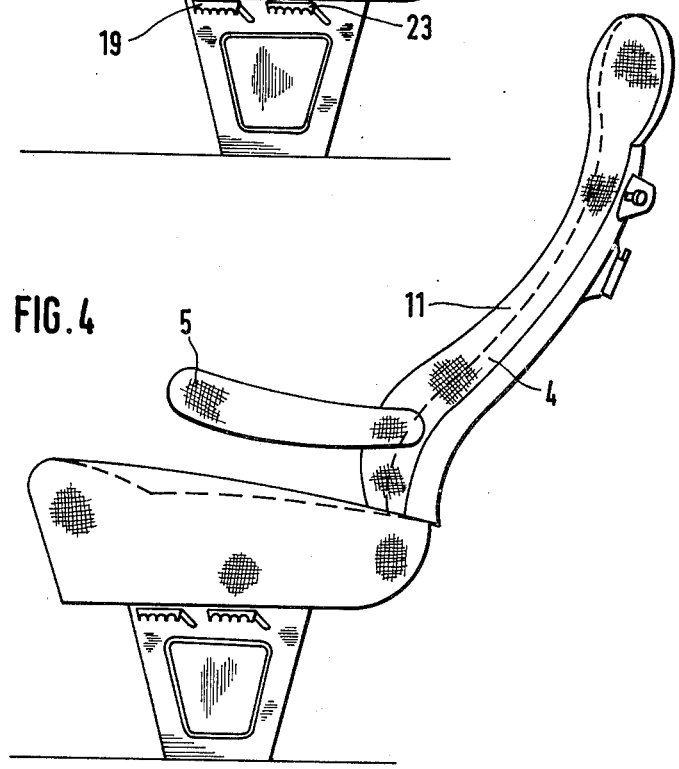
FIG. 4 shows a side view of the seat with an inclined position of the backrest.

The backrest 4 is adjustable between the two positions shown in FIG. 3 and 4. For this purpose, below the seat frame assembly 6 a gas pressure spring 17 is disposed which at one end rests against the seat frame assembly 6 and at the other end is connected to a downward extending arm 18 attached to the backrest frame assembly 9. By means of an adjustment lever 19 at the side the locking of the gas pressure spring 17 may be released, so that the backrest 4 tilts forward under the force of the gas pressure spring 17 and can be brought into the desired position and can then be locked again.

Figure 10:
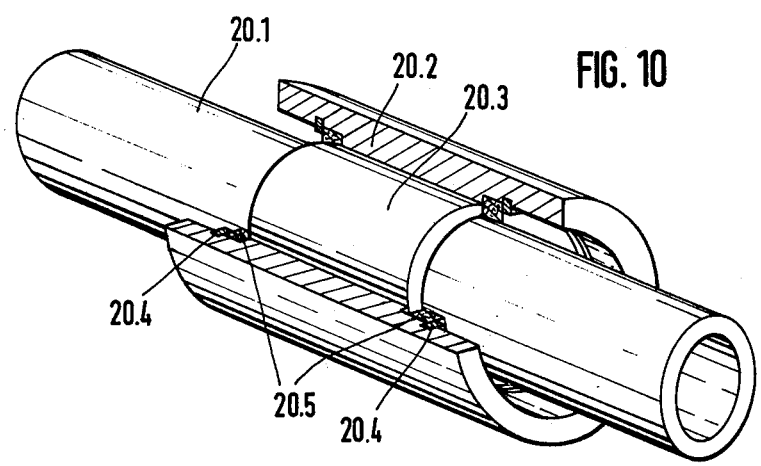
FIG. 10 shows the cylindrical guide assembly of the seat frame.

A lateral adjustment facility is provided for the row of seats adjacent to the corridor of the vehicle. The seat 3 is slidable on the support frame 2 along a cylindrical guide assembly 20 and a parallel plane guide assembly 21. The cylindrical guide assembly 20 is provided with a cylindrical tube 20.1 attached to the support frame 2, on which slide sleeves 20.2 attached to the seat frame assembly 6 can slide. A sleeve 20.3 of plastic material (see FIG. 10) is secured within the sliding sleeve 20.2 between two snap rings 20.4. For example, the sleeve 20.3 may consist of the material ITPE. Felt strip rings 20.5 on both sides of the sleeve 20.3 serve to wipe off dirt or contaminations from the cylindrical tube 20.1.

Figure 11:
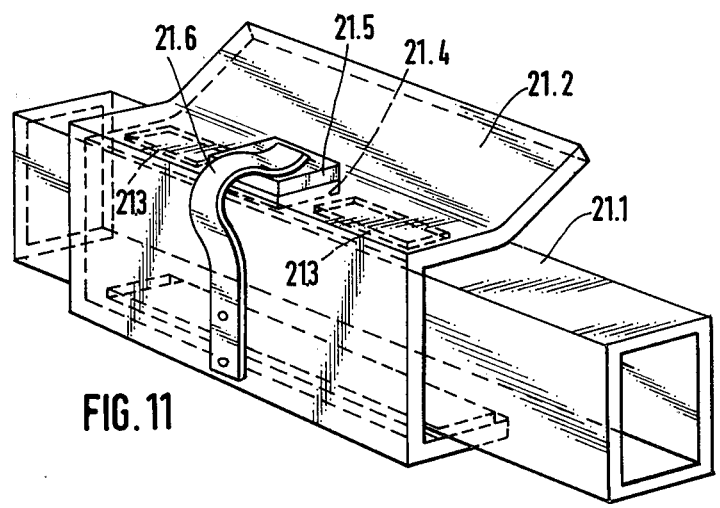
FIG. 11 shows the plane guide assembly of the seat frame.

The flat slide assembly 21 comprises a square tube 21.1 attached to the support frame 2 which is embraced by a U-shaped guide member 21.2 attached to the seat frame assembly 6 (see FIG. 11). Slide members 21.3 consisting of a plastic material (preferrably ITPE) are attached to the upper and lower leg of the U-shaped guide member 21.2 and slide on the square slide tube 21.1. The upper leg of the guide member 21.2 has an opening 21.4, in which a slide member 21.5 is disposed, preferably also consisting of a plastic material, and is pressed into contact with the square tube 21.1 by means of the spring 21.6, which in the embodiment shown has the form of a curved leaf spring. The spring-loaded slide member 21.5 causes a compensation of tolerance deviations and serves to avoid rattling of the seat against the guide assembly 21 in the unloaded condition.

A jamming during a displacement of the seat is effectively prevented, since the seat is guided in the horizontal direction only by the cylindrical guide assembly 20, whereas the flat guide assembly 21 merely serves to guide the seat in the vertical direction.

In order to arrest the seat in the two end positions of the transverse movement two notches 22.1 and 22.1 are provided in a transverse beam of the support frame 2 and a detent 24 engages in these notches in the two end positions. The detent 24 can be lifted off by means of an adjustment lever 23.

Figure 7:
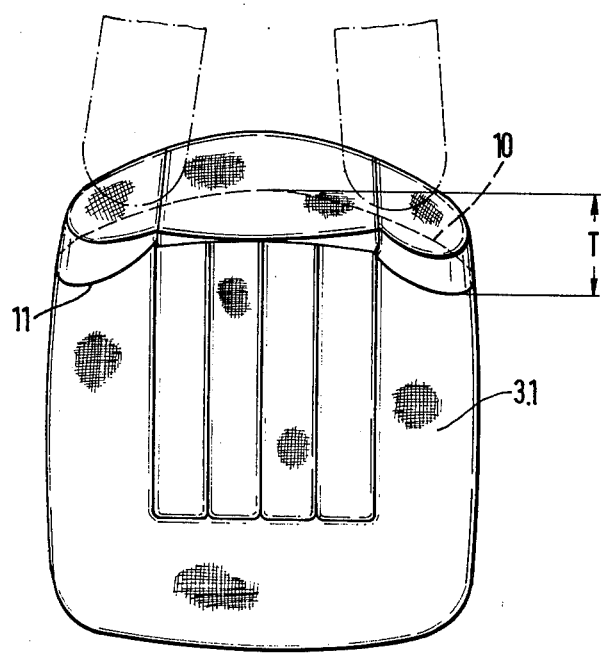
FIG. 7 shows a plan view of the seat with upholstery.

The plan view of FIG. 7 shows in dash-dot lines the legs of a person sitting on the seat behind and also shows in dashed lines at the elevation of the knees the pronounced transverse curvature of the shell 10 of the backrest. The depth of the backrest, which is important in view of the space required, in the illustrated embodiment is 14 cm.

Whereas in the known seats of the state of the art the side displacement of the seat towards the corridor of the vehicle was only possible by lifting the seat, in the inventive seat arrangement it is sufficient to actuate the adjustment lever 23. The seat can then be easily displaced towards the side without jamming.

Figure 5:
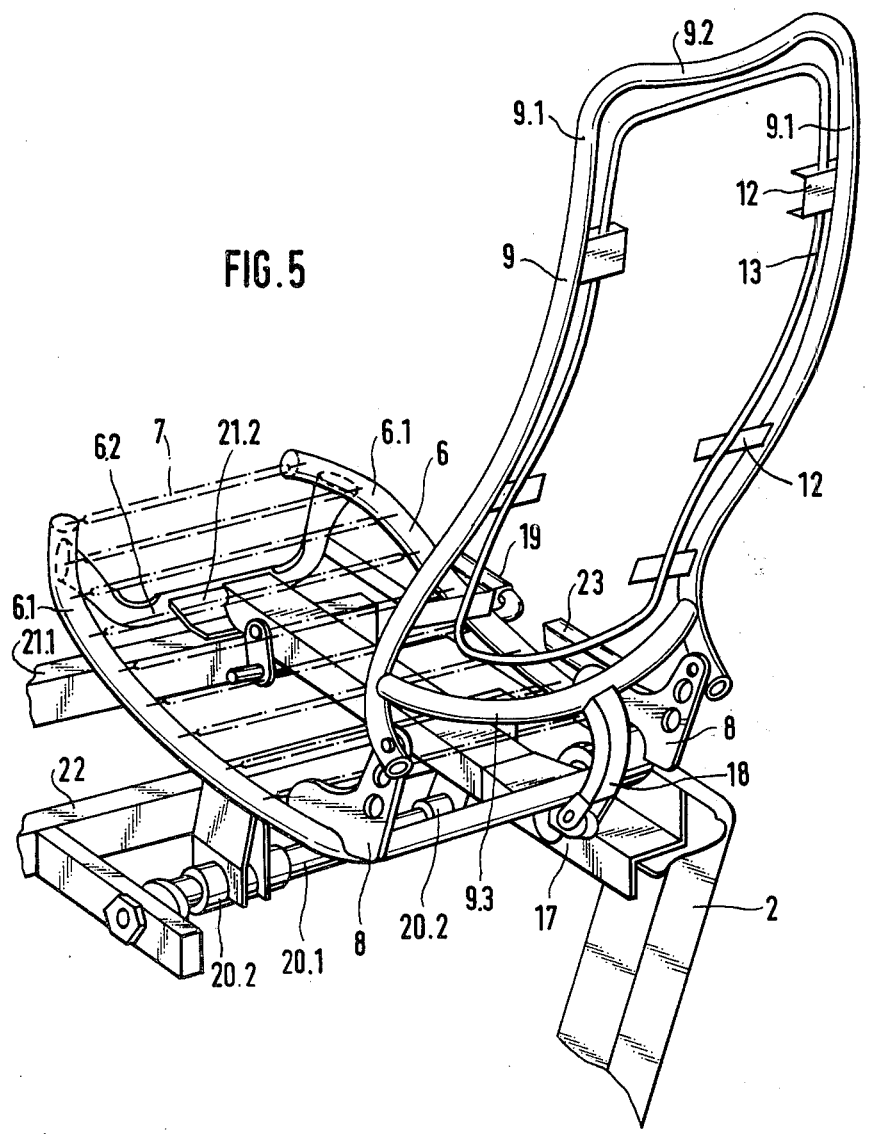
FIG. 5 shows a perspective view of the seat frame.
Figure 6:
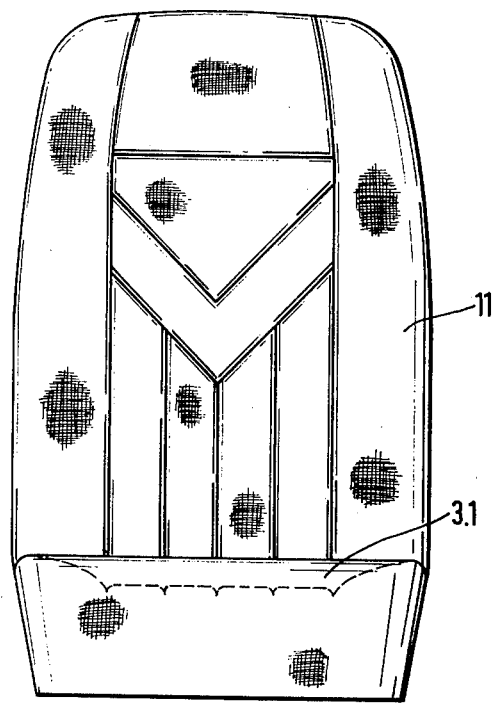
FIG. 6 shows a front view of the seat with upholstery.
Figure 8:
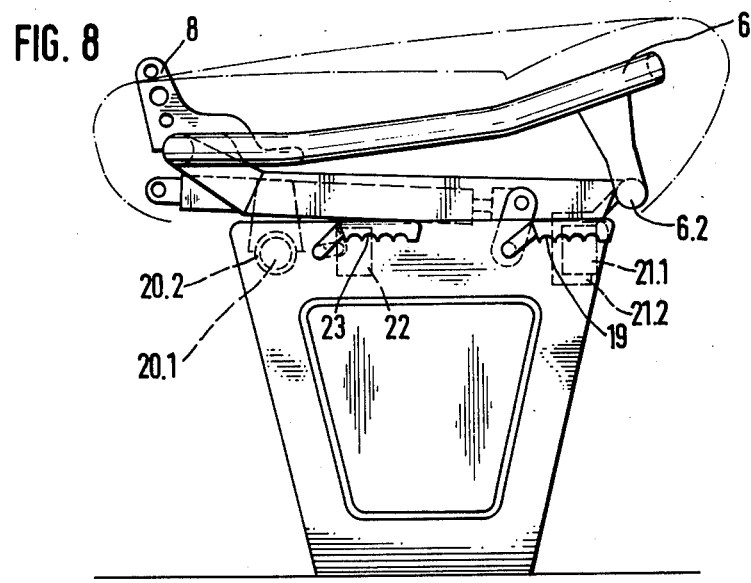
FIG. 8 shows a side view of the seat frame.
Figure 9:
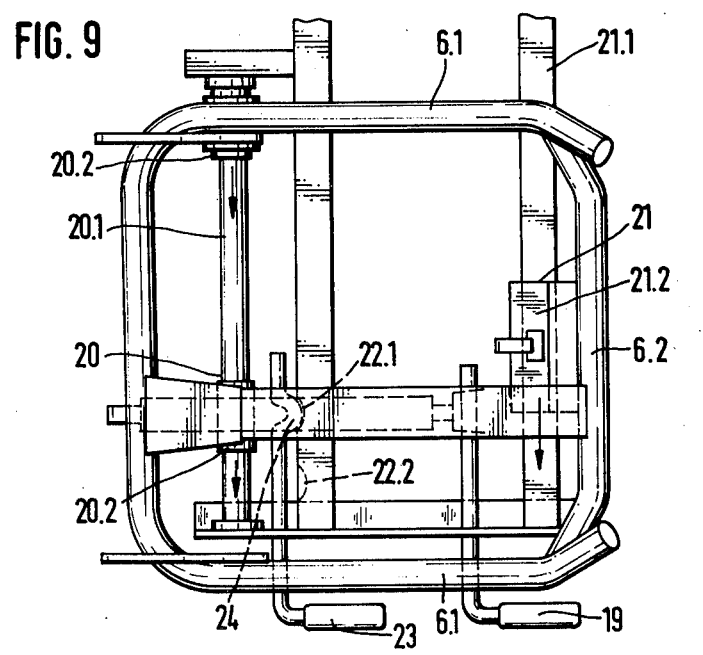
FIG. 9 shows a plan view of the seat frame.

As can be seen from FIGS. 5, 8, and 9, the cylindrical guide tube 20.1 is only provided in the region of the seat frame assembly 6, which can be displaced sidewards. The square tube 21.1 and the beam 22, which may also have the shape of a square tube, are extended further and also carry the frame of the seat adjacent to the illustrated seat (not shown in the figures), which has no facilities for a lateral displacement. As can be seen from FIG. 9, the detent 24 is formed by a crimped shoulder on the rod connected to the lever 23.

From FIG. 8, the especially advantageous floor clearance of the seat can be seen. A blockable tension spring or compression spring may also be used instead of the gas pressure spring 17.

The coil springs 7 of the lower support springs, which are contained in plastic sheaths, obviate the need for a fully foamed seat, which has the disadvantage, that already after a short term use a decrease in the stiffness of the seat in the order of 30 – 50% occurs. The plastic sheaths of the springs 7 cause a dampening, which increases the comfort of the seat.

While the invention has been described above in connection with certain embodiments, many modifications and changes therein may be effected by those skilled in the art. Accordingly, it is intended that the appended claims cover all such modifications and changes as fall within the true spirit and scope of the invention.

What is claimed is:

1. In a seat for vehicles, especially busses, having an upholstered seat to which a backrest is hinged and which may be tilted and adjusted by means of an adjustment lever, the improvement comprising:
    a seat frame assembly having side frame members and springs attached under tension between said side frame members, upholstery for the seat, a backrest frame assembly and backrest upholstery;
    a support frame having a transverse cylindrical guide and a guide having a flat upper surface spaced from and substantially parallel to said cylindrical guide; and
    said seat frame assembly having a sleeve slidably embracing said cylindrical guide and a bearing member slidably supported by said flat upper surface, wherein said flat upper surface is on a square tube attached to said support frame, which is embraced by a U-shaped guide member attached to the seat frame assembly and comprising said bearing member.

2. The seat of claim 1, wherein at least one of said U-shaped guide member and said slide sleeves is provided with slide surfaces with a covering of plastic material.

3. The seat of claim 1, wherein on one leg of said U-shaped guide member a guide pad is movably disposed and is pressed into contact with said flat guide assembly by means of a spring.

4. The seat of claim 1, especially for use in the seat rows adjacent to a long corridor of a vehicle, having at least one armrest mounted thereon for height adjustment, the armrest being pivoted to the backrest whereby said armrest can be lowered by tilting into a position alongside an edge of the backrest and the seat.

5. The seat of claim 4, wherein said armrest is secured to the backrest by means of a pivot and ratchet assembly, to which a locking mechanism for adjustment of the armrest is secured, said locking mechanism comprising a gravity actuated latch and a toothed ratchet, said toothed ratchet being disposed inside the armrest, said ratchet being provided at its lower end with a lifting flank engageable with said latch and with a stop for said latch at its upper end, said latch being freely rotatably journalled on a second fixed pivot and is provided with a pawl assembly which holds the latch in a position out of engagement with the toothed ratchet, said pawl being disengaged upon the latch hitting said upper stop on the toothed ratchet, so that the latch falls into engagement with said toothed ratchet.

6. The seat of claim 5, wherein said pivot axis for the armrest carries a support bracket, which is non-rotatably secured thereto and said latch and a mounting portion of said pawl are disposed on said support bracket.

7. Seat of claim 1, wherein a transverse beam of said support frame is provided with detent notches, with which a detent carried by said seat engages in the two end positions of the seat, and an adjustment lever on said seat for lifting said detent into a disengaged position.

* * * * *